March 12, 1957 G. M. BOYER 2,784,518
MULTIPURPOSE FISHING FLOAT
Filed April 23, 1953
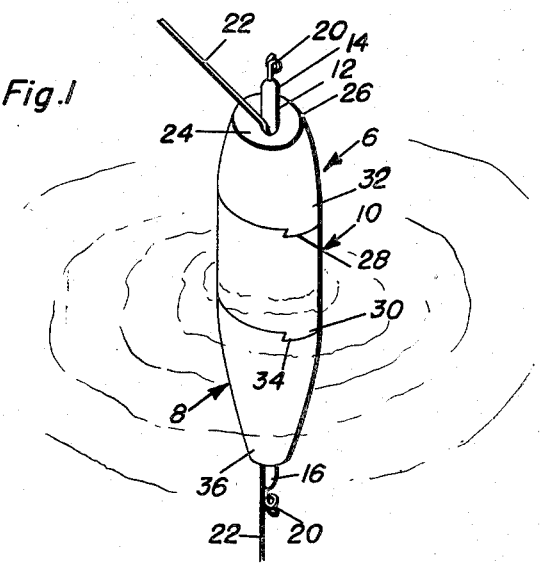
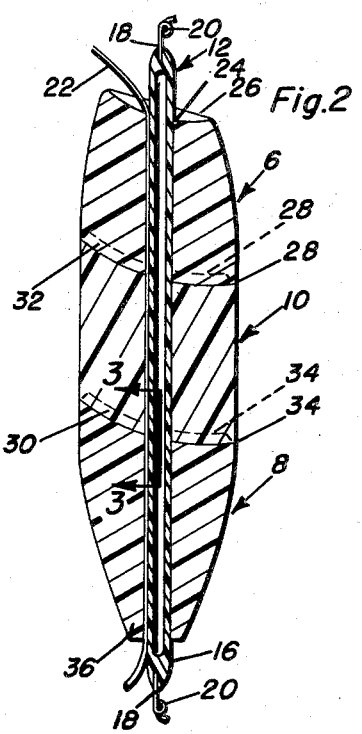
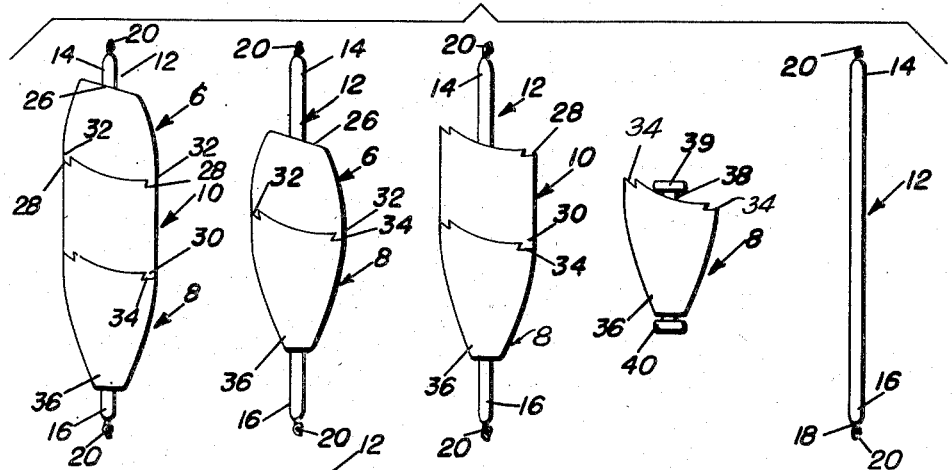
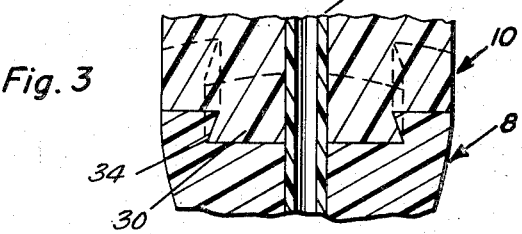
Guy M. Boyer
INVENTOR.
BY
*Attorneys*

# United States Patent Office 2,784,518
Patented Mar. 12, 1957

2,784,518
MULTIPURPOSE FISHING FLOAT
Guy M. Boyer, Houston, Tex.

Application April 23, 1953, Serial No. 350,683

2 Claims. (Cl. 43—44.91)

The present invention relates to improvements in a fishing float and has reference in particular to a convertible sectional float construction wherein the sections or members are susceptible of selective use, whereby to thus provide a multipurpose float the size of which may be regulated to comply with the varying needs of users.

A general object of the invention is to provide a simple, practical and economical sectional float which will function in a manner to supply a fisherman with five different fishing floats of varying sizes.

In carrying out a preferred embodiment of the invention four components or sections are utilized each of which may be employed by itself as an individual fishing float, with the exception of one component, each thus used component, selectively or collectively considered, filling a different and distinct purpose in the tackle box of the fisherman.

A further object of the invention has to do with a sectional float of a so-called knockdown character which functions to provide a multipurpose combination float wherein the owner or user will have at his fingertips the exact size of float desired while, at the same time obviating the necessity of overloading his tackle box with five distinctly different floats.

Briefly summarized, the invention is characterized by a plurality of axially aligned float members or components abutting one another in end to end relationship, the abutting ends being separably interlocked through the medium of a novel dovetail joint, said members having axially aligned bores which cooperate in forming an open-ended passage, there being a rod or stem fitted in the passage, and a fishing line threaded through the passage and crowded between the cooperating walls of said passage and cooperating surfaces of said rod, whereby to frictionally lodge and hold the rod in said passage.

More specifically, it is an object of the invention to provide a multipurpose float characterized by an axially bored float member having an arcuately curved concave end and complemental corresponding curved dovetail groove or mortise and provided at the opposite end, with an outstanding central convex dovetail tenon, a second axially bored float member having at least one arcuately curved concave end with a corresponding curved dovetail groove forming an open ended mortise into which said tenon is slidably keyed, whereby to provide a self-retained, dovetail joint between said members, an insertable and removable rod passing through said bores, and a fishing line threaded through said bores and positioned between the walls of the latter and surfaces of the rod and holding the rod in its intended position.

In addition to the above, novelty is predicated on a float construction characterized by at least one buoyant member having an axial bore opening through opposite ends, said bore being of the same or uniform diameter from end to end. A complemental rod passes removably through the bore and beyond the respective ends of the bore, said rod being of uniform cross-sectional diameter from end to end, a diameter which is slightly less than the diameter of the bore. A fishing line is threaded through the bore and is compressibly crowded and is in this manner jammed between the surfaces of the rod and the wall of the bore so as to frictionally lodge and retain the rod in the bore and, in addition, the upper end of the float member is formed with a shallow concavity whose brim or marginal mouth portion is pitched so as to assume a sloping angle which is oblique in respect to the axis of the bore.

Other objects, features and advantages will become more readily apparent from the following description and the accompanying sheet of illustrative drawings.

In the drawings, wherein like numerals are employed to designate like parts throughout the views:

Figure 1 is a perspective view of the improved multipurpose fishing float showing the full or complete float and the accompanying fishing line;

Figure 2 is an enlarged sectional view with portions in elevation, showing the details and the manner in which they are constructed and how they cooperate with each other;

Figure 3 is an exaggerated fragmentary sectional view taken on the plane of the line 3—3 of Figure 2; and Figure 4 is a group view showing the manner in which the sections or components are utilized individually and collectively to provide the five-in-one multipurpose float.

With reference now to the drawings it will be seen that the various sections or components are molded from commercial plastics and are of the shapes and constructional form clearly illustrated in the drawings. The top section or component is denoted by the numeral 6, the bottom one at 8, and the intervening intermediate one at 10. Each section has a longitudinal bore and the bores of the respective sections are aligned to provide a passage of uniform diameter to accommodate the insertable and removable keying rod or stem 12. The rod or stem 12 is hollow, is of uniform cross-sectional diameter, slightly less than the diameter of the passage, and has reduced ends 14 and 16 and a copper or equivalent non-corrodible wire 18 is axially embedded in each end and has an extending free end portion which is coiled to form what may be called a pig-tail coil or catch 20. Used by itself as shown, for example, at the right in Figure 4 this rod is a satisfactory perch quill and, obviously, the pig-tail coils constitute catches for attaching the fishing line thereto (not shown). It is repeated that the cross-section or diameter of the rod is slightly less than that of the passage extending through the over-all or complete float. This allows a portion of the fishing line 22 to be threaded through the passage and jammed and held between the wall of the passage and the surface of the rod so as to frictionally lodge and retain the rod in its intended position. The rod is longer than the several combined float sections 6, 8 and 10 with its ends projecting, as best shown in Figure 2. The upper or top end of the top section 6 is formed with a concavity 24 and the marginal edge or brim is obliquely inclined as shown at 26. It is submitted that this special sloping concave top provides a "popping" pocket which is acceptably correct for weakfish tackle. This type of float, incidentally, when made of cork or Balsam wood would be called a popping cork. It will be noted that the upper concave end of the intermediate section 10 has a central open ended wedge-shaped groove 28 while a wedge-shaped convex tenon 30 is formed on the lower end of said section. The lower convex end of the top or upper section 6 has a wedge-shaped tenon 32 with which the concave wedge-shaped groove 28 is interlocked thus providing a unique separable dovetail joint. The upper end of the lower section or component 8 is provided with a concave wedge-shaped groove 34 which has interlocking connection with the correspondingly shaped convex tenon 30 in the intermediate section 10. The lower end of the lower section is preferably tapered in a manner shown at 36. The respective abutting surface of these separable and connectible sections 6, 8, and 10 are arcuately curved so as to provide a concave end where necessary and a convex end with the convex end seated or nested in the concave portion. Obviously, this dovetail joint arrangement provides jointing means which will not come apart of its own accord.

In Figure 4 it will be clear that there are five fishing floats available and that when the three components 6, 8 and 10 are interlocked with the rod means fitted therethrough they combine to provide a large float, as at the left. When the upper and lower components 6 and 8 are interlocked as in Figure 4 a medium sized float is provided. A medium sized float can also be made by combining the two sections 10 and 8 in the manner shown. The small float, which is the bottom section 8 has a rod 38 fitted therethrough with removable buttons 39 and 40 on the upper and lower ends. In respect to piece 8 in Figure 4, with the removable buttons, the line is inserted through the buttons. A knot is tied in the line to allow the line to slide through the float to a predetermined depth, so that a fisherman is enabled to retract his hook, sinker and float almost to the rod tip for ease and accuracy in casting. The float then slides up the line to the knot. The buttons 39 and 40 are not intended to be an integral part of the multi-float.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A multipurpose float comprising a plurality of complemental separable and connectible companion float members embodying a first axially bored float member having at least one end surface inclined at an angle oblique to the longitudinal axis of said member, said one end surface being arcuately curved and concave and being centrally provided with a groove wedge-shaped in cross-section and opening at its respective ends through diametrically opposite sides of said float member, a second axially bored float member having a corresponding oblique angled end surface which is likewise arcuately curved and conformingly convex, said last named end surface abutting and being nested in said concave end, said convex end having a central wedge-shaped rib providing a key and being slidably keyed in said groove, whereby to thus provide a friction-retained dovetailed joint between said float members, the predetermined self-tightening and retentive cooperation of the rib and groove being attained through the medium of the abutting oblique-angled arcuately curved concavo-convex surfaces.

2. The structure defined in claim 1, and wherein the bores of said float members are aligned with each other and are of the same as well as uniform diameter from end to end, and the combination therewith of a complemental rod passing removably through the two bores and beyond the respective ends of said bores, said rod being of uniform cross-sectional diameter from end to end and of a diameter slightly less than the diameter of said bores, and a fishing line threaded through said bores and compressibly crowded and jammed between cooperating surfaces of the rod and the walls of the bores and frictionally lodging and retaining said rod in said bores, the upper end of said first named float member being formed with a shallow concavity including a brim, said brim being sloped to assume an angle which is oblique in respect to the axis of the over-all float.

References Cited in the file of this patent

UNITED STATES PATENTS

| | | |
|---|---|---|
| 290,154 | Vidal | Dec. 11, 1883 |
| 826,707 | Brent | July 24, 1906 |
| 942,047 | Atkinson | Dec. 7, 1909 |
| 1,152,755 | Perron | Sept. 7, 1915 |
| 1,632,502 | Peckham | June 14, 1927 |
| 1,867,458 | Keuper | July 12, 1932 |
| 2,127,667 | Pflueger | Aug. 23, 1938 |
| 2,137,341 | Hingle | Nov. 22, 1938 |
| 2,262,974 | Steiner | Nov. 18, 1941 |
| 2,472,363 | Blackinton | June 7, 1949 |
| 2,559,084 | McGlade | July 3, 1951 |

FOREIGN PATENTS

| | | |
|---|---|---|
| 16,918 | Great Britain | 1907 |